(12) United States Patent
Boss et al.

(10) Patent No.: US 8,032,407 B2
(45) Date of Patent: *Oct. 4, 2011

(54) APPLICATION OF BROKERING METHODS TO SCALABILITY CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

This patent is subject to a terminal disclaimer.

(21) Appl. No.: 11/756,416

(22) Filed: May 31, 2007

(65) Prior Publication Data

US 2008/0301030 A1 Dec. 4, 2008

(51) Int. Cl.
 *G05B 19/418* (2006.01)
 *G06F 9/46* (2006.01)
 *G06Q 10/00* (2006.01)
 *G06Q 30/00* (2006.01)

(52) U.S. Cl. .......................................... 705/8; 705/1.1
(58) Field of Classification Search .................. 705/1
 See application file for complete search history.

(56) References Cited

U.S. PATENT DOCUMENTS

| | | | |
|---|---|---|---|
| 5,371,780 A | 12/1994 | Amitay | |
| 6,236,981 B1 | 5/2001 | Hill | |
| 6,438,539 B1 | 8/2002 | Korolev et al. | |
| 6,550,881 B1 | 4/2003 | Phillips | |
| 6,553,568 B1 | 4/2003 | Fijolek et al. | |
| 6,678,700 B1 | 1/2004 | Moore et al. | |
| 6,732,140 B1 | 5/2004 | McCue | |
| 6,754,739 B1 | 6/2004 | Kessler et al. | |
| 6,842,899 B2 | 1/2005 | Moody et al. | |
| 6,859,927 B2 | 2/2005 | Moody et al. | |
| 6,925,493 B1 | 8/2005 | Barkan et al. | |
| 6,947,987 B2 | 9/2005 | Boland | |
| 6,968,323 B1 | 11/2005 | Bansal et al. | |
| 7,062,559 B2 | 6/2006 | Yoshimura et al. | |
| 7,099,681 B2 | 8/2006 | O'Neill | |
| 7,103,580 B1 | 9/2006 | Batachia et al. | |
| 7,103,847 B2 | 9/2006 | Alford, Jr. et al. | |
| 7,249,099 B2 | 7/2007 | Ling | |
| 7,266,523 B2 | 9/2007 | Depura et al. | |
| 7,401,035 B1 | 7/2008 | Young | |
| 7,634,430 B2 | 12/2009 | Huberman et al. | |

(Continued)

OTHER PUBLICATIONS

Boss et al, U.S. Appl. No. 11/756,325, Office Action Communication, Apr. 27, 2009, 10 pages.

(Continued)

*Primary Examiner* — Jonathan Ouellette
*Assistant Examiner* — Candice D Carter
(74) *Attorney, Agent, or Firm* — William Schiesser; Hoffman Warnick LLC

(57) ABSTRACT

This application describes an application of resource unit brokering algorithms, chip management methods for automated brokering, chip management methods for live brokering, and chip allocation methods to the brokering of scalability characteristics of service level management within an enterprise. Typically, the scalability characteristics are derived from known capacity values that are provided by configuration managers. Calculations are made on the capacity values and maximum quantities of the availability resource units are provided to resource brokers for spot or periodic sale and auction to one or more buyer's agents.

22 Claims, 4 Drawing Sheets

U.S. PATENT DOCUMENTS

| | | | |
|---|---|---|---|
| 7,899,696 | B2 | 3/2011 | Boss et al. |
| 7,899,697 | B2 | 3/2011 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1* | 4/2003 | Blazey et al. .......... 705/37 |
| 2003/0071861 | A1 | 4/2003 | Phillips |
| 2003/0083926 | A1 | 5/2003 | Semret et al. |
| 2003/0101124 | A1* | 5/2003 | Semret et al. .......... 705/37 |
| 2003/0167329 | A1 | 9/2003 | Kurakake et al. |
| 2003/0216971 | A1 | 11/2003 | Sick et al. |
| 2004/0010592 | A1 | 1/2004 | Carver et al. |
| 2004/0024687 | A1 | 2/2004 | Delenda |
| 2004/0059646 | A1 | 3/2004 | Harrington et al. |
| 2004/0111308 | A1 | 6/2004 | Yakov |
| 2004/0133506 | A1 | 7/2004 | Glodjo et al. |
| 2004/0133609 | A1 | 7/2004 | Moore et al. |
| 2004/0230317 | A1* | 11/2004 | Kumar et al. .......... 700/1 |
| 2005/0055306 | A1 | 3/2005 | Miller et al. |
| 2005/0071182 | A1 | 3/2005 | Aikens et al. |
| 2005/0138621 | A1 | 6/2005 | Clark et al. |
| 2005/0141554 | A1 | 6/2005 | Hammarlund et al. |
| 2005/0144115 | A1 | 6/2005 | Brett |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1 | 12/2005 | Friesen |
| 2006/0047550 | A1 | 3/2006 | Dineen et al. |
| 2006/0069621 | A1 | 3/2006 | Chang et al. |
| 2006/0080210 | A1 | 4/2006 | Mourad et al. |
| 2006/0080224 | A1 | 4/2006 | Schuelke |
| 2006/0080438 | A1 | 4/2006 | Storrie |
| 2006/0149652 | A1* | 7/2006 | Fellenstein et al. .......... 705/35 |
| 2006/0167703 | A1 | 7/2006 | Yakov |
| 2006/0195386 | A1 | 8/2006 | Glodjo et al. |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 | 4/2008 | Gates et al. |

OTHER PUBLICATIONS

Boss et al, U.S. Appl. No. 11/756,360, Office Action Communication, Apr. 24, 2009, 12 pages.
Boss et al, U.S. Appl. No. 11/755,985, Office Action Communication, Apr. 1, 2009, 23 pages.
Duermeyer, Karin, "Methodology: From Component Business Model to Service Oriented Architecture", Copyright IBM Corporation 2004.
U.S. Appl. No. 11/756,360, Office Action dated Feb. 8, 2010.
U.S. Appl. No. 11/756,325, Office Action dated Feb. 2, 2010.
U.S. Appl. No. 11/755,985, Office Action, dated Jan. 29, 2010.
U.S. Appl. No. 11/756,360, filed May 31, 2007, Final Office Action dated Oct. 14, 2009.
U.S. Appl. No. 11/756,325, filed May 31, 2007, Final Office Action dated Oct. 13, 2009.
U.S. Appl. No. 11/756,400, filed May 31, 2007, Office Action dated Oct. 8, 2009.
U.S. Appl. No. 11/756,386, filed May 31, 2007, Office Action dated Oct. 8, 2009.
U.S. Appl. No. 11/755,985, filed May 31, 2007, Final Office Action dated Nov. 2, 2009.
U.S. Appl. No. 11/756,426, filed May 31, 2007, Office Action dated Oct. 29, 2009.
Araque Jr., Gerardo, U.S. Appl. No. 11/756,313, filed May 31, 2007, Office Action dated Mar. 25, 2011, 33 pages.
Rankins, William E., U.S. Appl. No. 11/756,374, filed May 31, 2007, Office Action dated Mar. 11, 2011, 17 pages.
Nguyen, Nga B., U.S. Appl. No. 11/756,406, filed May 31, 2007, Final Office Action dated Feb. 22, 2011, 15 pages.
Garg, Yogesh C., U.S. Appl. No. 11/756,442, filed May 31, 2007, Office Action dated Feb. 10, 2011, 35 pages.
Mahapatra et al., "Oracle Parallel Processing", Copyright 2000, O'Reilly & Associates.
U.S. Appl. No. 11/756,426, Advisory Action dated Jun. 8, 2010, 3 pages.
U.S. Appl. No. 11/756,400, Advisory Action dated Jun. 8, 2010, 3 pages.
U.S. Appl. No. 11/756,360, Notice of Allowance and Fees Due dated May 19, 2010, 6 pages.
U.S. Appl. No. 11/756,386, Final Office Action dated Mar. 24, 2010, 14 pages.
U.S. Appl. No. 11/756,400, Final Office Action dated Mar. 24, 2010, 20 pages.
U.S. Appl. No. 11/756,426, Final Office Action dated Mar. 24, 2010, 20 pages.
U.S. Appl. No. 11/756,325, filed May 31, 2007, Notice of Allowance and Fees Due, dated Jul. 14, 2010, 10 pages.
U.S. Appl. No. 11/755,985, filed May 31, 2007, Final Office Action dated Jul. 1, 2010, 23 pages.
U.S. Appl. No. 11/756,386, filed May 31, 2007, Notice of Allowance and Fees Due, dated Jun. 29, 2010.
U.S. Appl. No. 11/756,313, filed May 31, 2007, Office Action dated Jun. 29, 2010, 31 pages.
U.S. Appl. No. 11/756,400, filed May 31, 2007, Office Action dated Jun. 24, 2010, 12 pages.
U.S. Appl. No. 11/756,426, filed May 31, 2007, Office Action dated Jun. 24, 2010, 10 pages.
U.S. Appl. No. 11/756,426, Advisory Action dated Jun. 8, 2010, 3 pages.
U.S. Appl. No. 11/756,400, Advisory Action dated Jun. 8, 2010, 3 pages.
U.S. Appl. No. 11/756,360, Notice of Allowance and Fees Due dated May 19, 2010, 6 pages.
U.S. Appl. No. 11/756,400, Final Office Action dated Mar. 24, 2010, 20 pages.
U.S. Appl. No. 11/756,426, Final Office Action dated Mar. 24, 2010, 20 pages.
Ozsomer, et al., "A Resource-Based Model of Market Learning in the Subsidiary: The Capabilities of Exploration and Exploitation", Journal of International Marketing, vol. 11, No. 3, 2003.
Staudenmayer, Nancy, "Interdependency: Conceptual, Empirical, and Practical Issues", The International Center for Research on the Management of Technology, Jun. 1997.
Carter, Candice D., U.S. Appl. No. 11/756,426, filed May 31, 2007, Notice of Allowance and Fees Due dated Oct. 20, 2010, 27 pages.
Gregg, Mary M., U.S. Appl. No. 11/755,985, filed May 31, 2007, Office Action dated Oct. 2010, 27 pages.
Carter, Candice D., U.S. Appl. No. 11/756,400, filed May 31, 2007, Notice of Allowance and Fees Due, 26 pages.
Nguyen, Nga, B., U.S. Appl. No. 11/756,406, filed May 31, 2007, Office Action dated Aug. 17, 2010, 32 pages.
Araque Jr., Gerardo, U.S. Appl. No. 11/756,313, filed May 31, 2007, Final Office Action dated Dec. 10, 2010.
Lan, Tzu-Hsiang, U.S. Appl. No. 11/755,971, filed May 31, 2007, Office Action dated Nov. 26, 2010.
Rankins, William E., U.S. Appl. No. 11/756,374, filed May 31, 2007, Office Action dated Oct. 29, 2010. 35 pages.
Lan, U.S. Appl. No. 11/755,971, Office Action Communication, May 19, 2011, 16 pages.
Carter, U.S. Appl. No. 11/756,360, Notice of Allowance & Fees Due, May 20, 2011, 19 pages.
Wai, U.S. Appl. No. 11/756,357, Office Action Communication, May 26, 2011, 32 pages.
Carter, U.S. Appl. No. 11/756,386, Notice of Allowance & Fees Due, May 23, 2011, 19 pages.

Gregg, U.S. Appl. No. 11/755,985, Office Action Communication, May 5, 2011, 35 pages.

The University of Melbourne: Annual Budget 2004, 84 pages: www.unimelb.edu.au/publications/docs/budget2004.pdf.

Wai, U.S. Appl. No. 11/756,367, Office Action Communication, Jun. 13, 2011, 38 pages.

Nisan, "Bidding and Allocation in Combinatorial Auctions", Proceedings of the 2nd ACM Conference on Electronic Commerce, 2000, 12 pages.

* cited by examiner

US 8,032,407 B2

APPLICATION OF BROKERING METHODS TO SCALABILITY CHARACTERISTICS

CROSS-REFERENCE TO RELATED APPLICATIONS

This application is related in some aspects to commonly owned patent application Ser. No. 11/756,367, entitled "RESOURCE MANAGEMENT FRAMEWORK", filed concurrently herewith, the entire contents of which are herein incorporated by reference.

This application is related in some aspects to commonly owned patent application Ser. No. 11/756,360, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,364, entitled "NON-DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,357, entitled "DISCRETE, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,325, entitled "FLUID, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,313, entitled "APPLICATION OF BROKERING METHODS TO AVAILABILITY CHARACTERISTICS", filed concurrently herewith, the entire contents of which are herein incorporated by reference.

This application is related in some aspects to commonly owned patent application Ser. No. 11/756,386, entitled "APPLICATION OF BROKERING METHODS TO PERFORMANCE CHARACTERISTICS", filed concurrently herewith, the entire contents of which are herein incorporated by reference.

This application is related in some aspects to commonly owned patent application Ser. No. 11/756,400, entitled "APPLICATION OF BROKERING METHODS TO RECOVERABILITY CHARACTERISTICS", filed concurrently herewith, the entire contents of which are herein incorporated by reference.

This application is related in some aspects to commonly owned patent application Ser. No. 11/756,386, entitled "APPLICATION OF BROKERING METHODS TO SECURITY CHARACTERISTICS", filed concurrently herewith, the entire contents of which are herein incorporated by reference.

This application is related in some aspects to commonly owned patent application Ser. No. 11/756,406, entitled "APPLICATION OF BROKERING METHODS TO OPERATIONAL SUPPORT CHARACTERISTICS", filed concurrently herewith, the entire contents of which are herein incorporated by reference.

FIELD OF THE INVENTION

The present invention generally relates to the brokering of scalability characteristics. Specifically, the present invention relates to the application of brokering methods and chip allocation/management methods to brokering scalability characteristics.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). To this extent, none of the existing approaches address how many resources a particular party is allowed to consume. That is, none of the existing approaches provide a way to adequately ration a party the computational resources in a way that will fulfill its needs, while not preventing the needs of other parties from being met. Accordingly, there exists a need in the art to overcome the deficiencies and limitations described hereinabove.

SUMMARY OF THE INVENTION

Aspects of this application describe the application of resource unit brokering algorithms, chip management methods for automated brokering, chip management methods for live brokering, and chip allocation methods to the brokering of scalability characteristics of service level management within an enterprise. Typically, the scalability characteristics are derived from known capacity values that are provided by configuration managers. Calculations are made on the capacity values and maximum quantities of the availability resource units are provided to resource brokers for spot or periodic sale and auction to one or more buyer's agents. Among other things, this application describes an offering of scalability service level characteristics for sale or auction in a Service Level and IT Resource Optimization framework.

One aspect of the present invention provides a method for applying brokering methods to scalability characteristics, comprising: obtaining configuration information; translating the configuration information that pertains to a scalability service category into a quantity of resource units; dividing the quantity of resource units by an associated cost for each of a set of service levels; determining a maximum quantity of each of the set of service levels that can be allocated for the quantity of resource units; and generating a matrix of possible configurations.

Another aspect of the present invention provides a system for applying brokering methods to scalability characteristics, comprising: a system for obtaining configuration information; a system for translating the configuration information that pertains to a scalability service category into a quantity of resource units; a system for dividing the quantity of resource units by an associated cost for each of a set of service levels; a system for determining a maximum quantity of each of the set of service levels that can be allocated for the quantity of resource units; and a system for generating a matrix of possible configurations.

Another aspect of the present invention provides a program product stored on a computer readable medium for applying brokering methods to scalability characteristics, the computer readable medium comprising program code for causing a computer system to: obtain configuration information; translate the configuration information that pertains to a scalability service category into a quantity of resource units; divide the quantity of resource units by an associated cost for each of a set of service levels; determine a maximum quantity of each of the set of service levels that can be allocated for the quantity of resource units; and generate a matrix of possible configurations.

Another aspect of the present invention provides computer software embodied in a propagated signal for applying brokering methods to scalability characteristics, the computer software comprising instructions for causing a computer system to: obtain configuration information; translate the configuration information that pertains to a scalability service category into a quantity of resource units; divide the quantity of resource units by an associated cost for each of a set of service levels; determine a maximum quantity of each of the set of service levels that can be allocated for the quantity of resource units; and generate a matrix of possible configurations.

Another aspect of the present invention provides a method for deploying a system for applying brokering methods to scalability characteristics, comprising: providing a computer infrastructure being operable to: obtain configuration information; translate the configuration information that pertains to a scalability service category into a quantity of resource units; divide the quantity of resource units by an associated cost for each of a set of service levels; determine a maximum quantity of each of the set of service levels that can be allocated for the quantity of resource units; and generate a matrix of possible configurations.

Another aspect of the present invention provides a data processing system for applying brokering methods to scalability characteristics, comprising: a processing unit, a bus coupled to the processing unit, a memory medium coupled to the bus, the bus comprising instructions, which when executed by the processing unit causes the data processing system to: obtain configuration information; translate the configuration information that pertains to a scalability service category into a quantity of resource units; divide the quantity of resource units by an associated cost for each of a set of service levels; determine a maximum quantity of each of the set of service levels that can be allocated for the quantity of resource units; and generate a matrix of possible configurations.

Each of these aspects can also include one or more of the following features (among others): using the matrix in an auction of computer resources; determining a winner of the auction; applying a multiplier to a bid of chips submitted by the winner to yield an adjusted amount of chips; deducting the adjusted amount of chips from a quantity of chips allocated to the winner; the bid being submitted to a resource unit broker by an agent on behalf of a party, and the bid being one a plurality of bids submitted by at least one agent on behalf of a plurality of parties; and the matrix being provided to the resource unit broker.

BRIEF DESCRIPTION OF THE DRAWINGS

These and other features of this invention will be more readily understood from the following detailed description of the various aspects of the invention taken in conjunction with the accompanying drawings in which.

Figure 1:
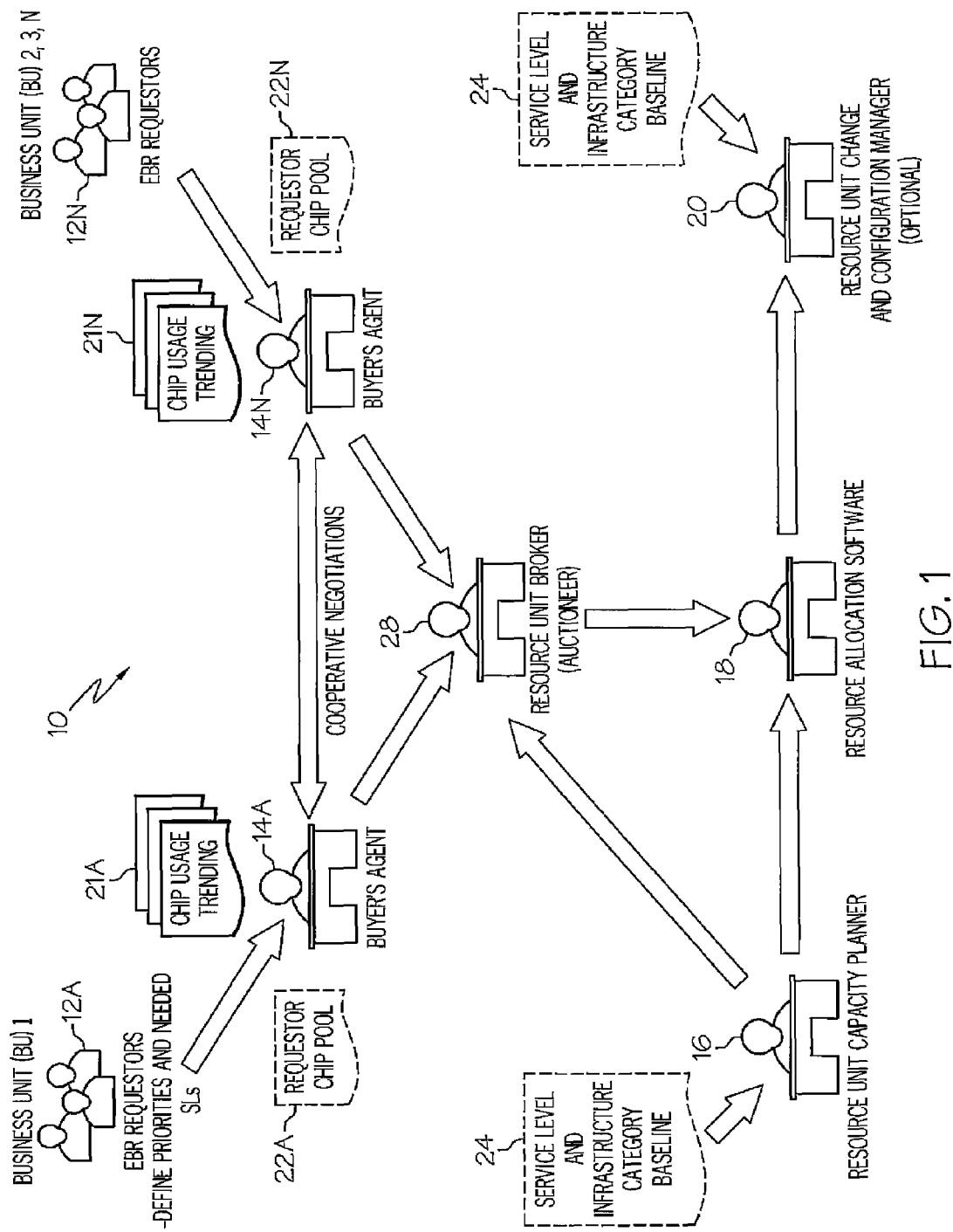
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Computerized Implementation
I. General Description
As used herein, the following terms have the following definitions:

"Chip" means any unit (virtual or otherwise) that may be exchanged for resources such as IT resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc.) sought by a party to accomplish objectives.

As indicated above, this application describes (among other things) an application of resource unit brokering algorithms, chip management methods for automated brokering, chip management methods for live brokering, and chip allocation methods to the brokering of scalability characteristics of service level management within an enterprise. Typically, the scalability characteristics are derived from known capacity values that are provided by configuration managers. Calculations are made on the capacity values and maximum quantities of the availability resource units are provided to resource brokers for spot or periodic sale and auction to one or more buyers' agents. Among other things, this application describes the offering of scalability service level characteristics for sale or auction in a Service Level and IT Resource Optimization framework.

Each service level category within a service level management framework can be decomposed into numerous component building blocks that tie into the sundry infrastructure categories within the IT infrastructure. These infrastructure categories include the storage subsystems, storage networks, servers or hosts, local area networks, operating systems and applications. It is understood that there might be other infrastructure categories depending upon how the infrastructure components of IT are decomposed.

The existence of certain components or quantities of components in each infrastructure category will predicate the ability to provide a particular service or provide differing service levels of the service. These components can be expressed typically in terms of capacities, assets, personnel and configurations. It is these constituent capacities, assets, personnel and configurations that are grouped and offered to aid in the support of a particular service level. This application does not discuss the groups that comprise a particular service level. Rather, it this application describes the need for these groups and how multiple groups of capacities, assets, personnel and configurations are required to define service levels. The constituent capacities, assets, personnel and configurations each have unique enablers that allow them to fit into the overall Service Level and IT Resource Optimization framework. This application describes (among other things) illustrative methods and processes to take a suggested grouping of constituent capacities, assets, personnel and configurations as they relate to a scalability service category and enable them to be sold, bartered and auctioned in the Service Level and IT Resource Optimization framework being advanced by the inventors.

Referring now to FIG. 1, a resource management framework (hereinafter framework 10) is depicted as described in which was cross-referenced and incorporated above. This framework is typically leveraged under the present invention, and hence, is being shown and described in conjunction with FIG. 1. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip usage trending 21A-N, requester chip pool 22A-N, and service level and infrastructure category baseline 24.

An objective of framework 10 is to reach a means of maximizing utilization of IT Resources among competing consumers such as business units 12A-B by distribution of the decision making/allocation process according to relative needs of applications. Doing so eliminates the need for traditional service level agreements (SLAs), and allows each business unit 12A-N to make dynamic "free market" decisions as to how best to obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business unit's 12A-N behalf. Various methods can be employed by the resource unit broker 28 to fulfill requests for resources to consumers or business units 12A-N. One method is using non-depleting chips (as further described in which was cross-referenced and incorporated above), another involves the use of discrete chips (as further described in which was cross-referenced and incorporated above). Yet another involves the use of fluid chips (as further described in which was cross-referenced and incorporated above). Regardless, the buyers' agents 14A-N understand the thresholds business units 12A-N are willing to pay, their associated targets for various service level characteristics, and will programmatically employ the most advantageous bidding strategy.

The resource unit capacity planner 16 reports to resource unit brokers 28 (i.e., auctioneers) what resources are available (e.g., infrastructure components) at any given time. Resource allocation software 18 includes products such as Enterprise Workload manager (EWLM), WebSphere XD, and Partition Load Manager (EWLM, Enterprise Workload Manager, WebSphere XD, and Partition Load Manage are trademarks of IBM Corp. in the United States and/or other countries). The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by optional resource unit change and configuration manager 20.

As indicated above, the present invention involves the management and/or allocation of discrete, depleting chips to parties such as business units 12A-N. That is, business units 12A-N will be allocated a certain/fixed quantity of chips pursuant to a business transaction (e.g., a financial transaction). Those chips can then be used for bidding in an attempt to be allocated computational resources. Under an embodiment of the present invention, the chips are considered discrete because they are intended to be used in a scheduled event such as a scheduled auction. In this regard, auction winners are granted resources for known periods of time, and can thus base future decisions on the knowledge that they are ensured the desired resources for the duration of the allocation cycle.

Consider, for the sake of simplicity, the case where only two business units 12A-N are competing for IT resources. These business units 12A-N will be known simply as BU1 and BU2, and each is represented by its own respective agent 14A-N. In the discrete chip model, again, periodic auctions are held, and winners determined for the duration of the allocation cycle, such that resources are distributed accordingly. Specifically, agents 14A-N will submit bids on behalf of business units 12A-N. Each bid is for an amount (e.g., one or more) of chips that were allocated to business units 12A-N. It should be noted that each business unit 12A-N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined above.

Figure 2A:
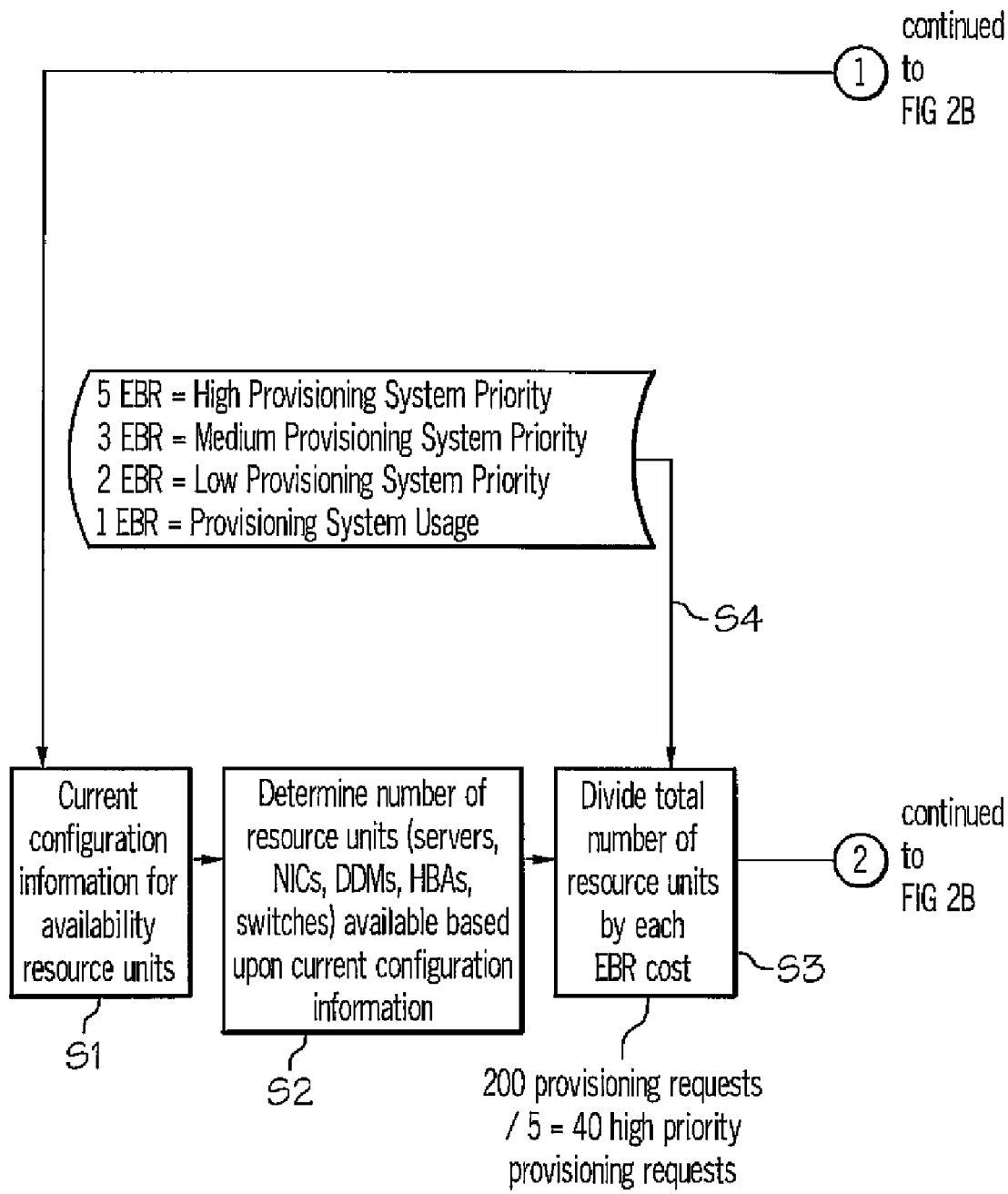
FIG. 2 depicts a method flow diagram according to the present invention.
Figure 2B:
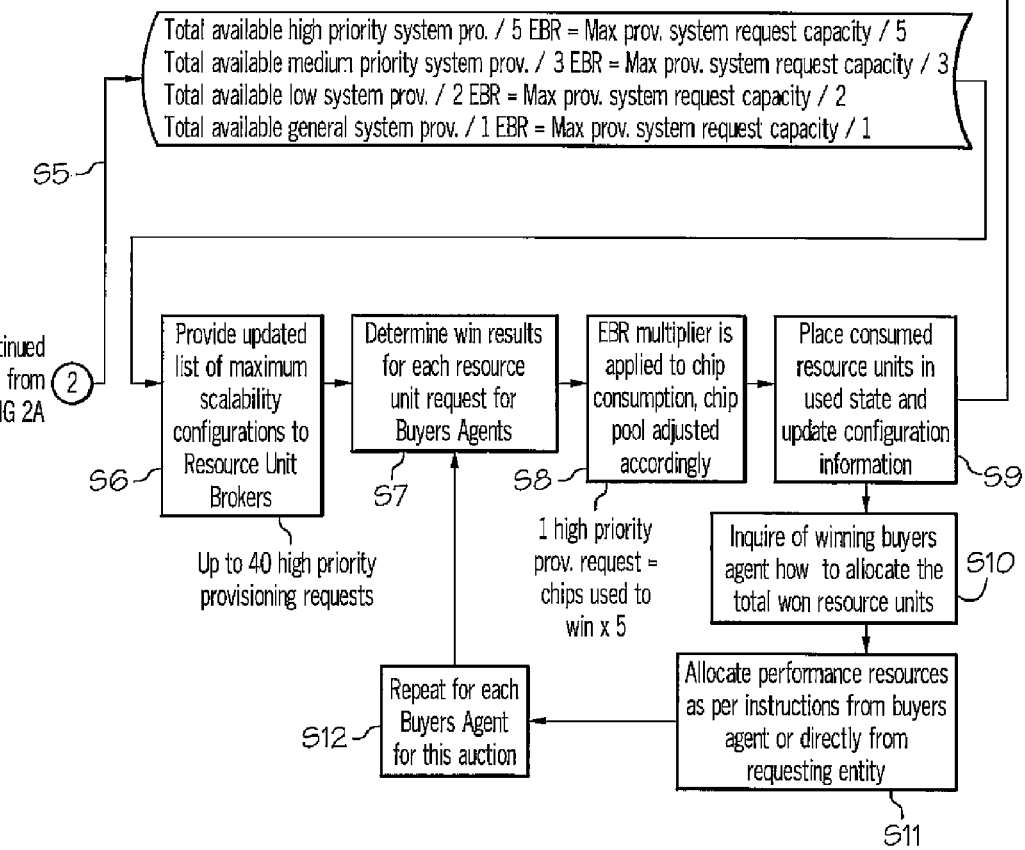

Referring now to FIG. 2, a method flow diagram according to the present invention is shown. Initially, in step S1, current configuration information (CI) is maintained by an external process or system, wherein this CI is passed along. This CI includes capacities, assets, personnel, systems and the like that are arranged into supported configurations to support the IT infrastructure. The particular CI that pertains most to the scalability service category is translated into a resource unit in step S2, which is the most granular unit of asset, personnel, capacity, etc. that can be described. For example, there might exist 80 TBs of usable storage capacity available in the storage infrastructure category that can be provisioned to for new use. The smallest allocatable increment of capacity is 100 GB and is set by IT policy. Therefore, there exists 800 storage capacity resource units. This simple example can be expanded to numbers of physical servers, number of network interface cards (NICs), number of resources required to support incident management processes, etc. In step S3, each resource unit group is further decomposed into a varying level of service based upon the maximum CI information for scalability service level categories by dividing the total CI information for each scalability service level related capacities, assets, personnel and configurations by the elemental biddable resource cost for that supported configuration, where a configuration is a logical collection of capacities, assets and personnel to meet or exceed a service level.

As depicted in step S4, the resource units that comprise the scalability service category generally include (among others) the: high provisioning system priority; medium provisioning system priority; low provisioning system priority, and provisioning system usage. Each resource unit can be grouped into several infrastructure category configurations to form a varying series of service levels, called elemental biddable resources (EBR). The EBR is assigned a simple weight to denote its "cost" or complexity of implementation compared to other EBRs in that particular infrastructure category. The scale can be described by the following:

EBR 1 is the same as a single resource unit,

EBR 2 is approx. double in complexity or cost above EBR 1,

EBR 3 is approx. double in complexity or cost above EBR 2,

EBR 5 is approx. double in complexity or cost above EBR 3.

Note: the quantifiable difference between each entry in the EBR scale is not novel by itself, but it is important to note that there are differences in each entry and that going from the lowest (1 in this example) to the highest (5 in this example) the service levels improve. Additionally, the numbering system is arbitrary, suffice that each entry be unique and lower numbers equate to lower levels of service.

Once the EBR scale is defined for each applicable infrastructure category, a calculation is made in step S5 to determine how much of each resource unit can be allocated to maintain a service level configuration. Once the EBR scale is defined for each applicable infrastructure category, a calculation is made to determine how much of each resource unit can be allocated to maintain a service level configuration. For example, if the CI returns that the provisioning system can handle 100 simultaneous provisioning requests, the calculations made in this step shows that for:

EBR 1: up to 100 (100/1) Non-sev general requests can be managed, but are handled after all severity rated requests;

EBR 2: up to 50 (100/2) Sev 3 low priority requests can be managed, but take low priority after Sev 1 and Sev 2 requests;

EBR 3: up to 33 (100/3) Sev 2 medium priority requests can be managed, but take medium priority after Sev 1 requests; and EBR 5: up to 20 (100/5) Sev 1 high priority requests can be managed, and take the highest priority on first come first served basis.

A matrix of maximum possible configurations for each EBR scale is provided to the resource unit broker(s) along with a reserve price for each resource unit configuration in the scale in step S6. In step S7, the resource unit broker(s) auction or sell the resource units to the buyer's agents and win results including number of chips used to win the bid are provided back to this process. In making this transaction, any algorithm or theory could be applied (e.g., static event(s), discrete event(s). Regardless, in step S8, a multiplier is applied to the number chips used to win and the adjusted amount is deducted from the chip bank for the winning buyer's agent. This multiplier is based on an EBR scale such as the following:

EBR 1: chips required to win×1
EBR 2: chips required to win×2
EBR 3: chips required to win×3
EBR 5: chips required to win×5

In an alternate embodiment, this multiplier can used to set the reserve bid for each resource unit configuration available as opposed to a multiplier at the end of the auction process. By adjusting the multiplier, more or less economies of scale can be realized. The inventors also denote that the multiplier need not be static, and in fact, can be adjusted based upon resource unit supply. Regardless, in step S9, those resource unit configurations are placed in a consumed state and updated configuration information is sent to the configuration manager or configuration management process. In step S10, an inquiry request is sent to the winning buyer's agent to provide more details on the nature of provisioning the winning resource unit configuration, such as when to provision the resources and other capacity information as required. In step S11, the resource unit configurations are allocated as requested. The process can then be repeated for each buyer's agent and/or for each resource unit configuration available.

II. Computerized Implementation

Figure 3:
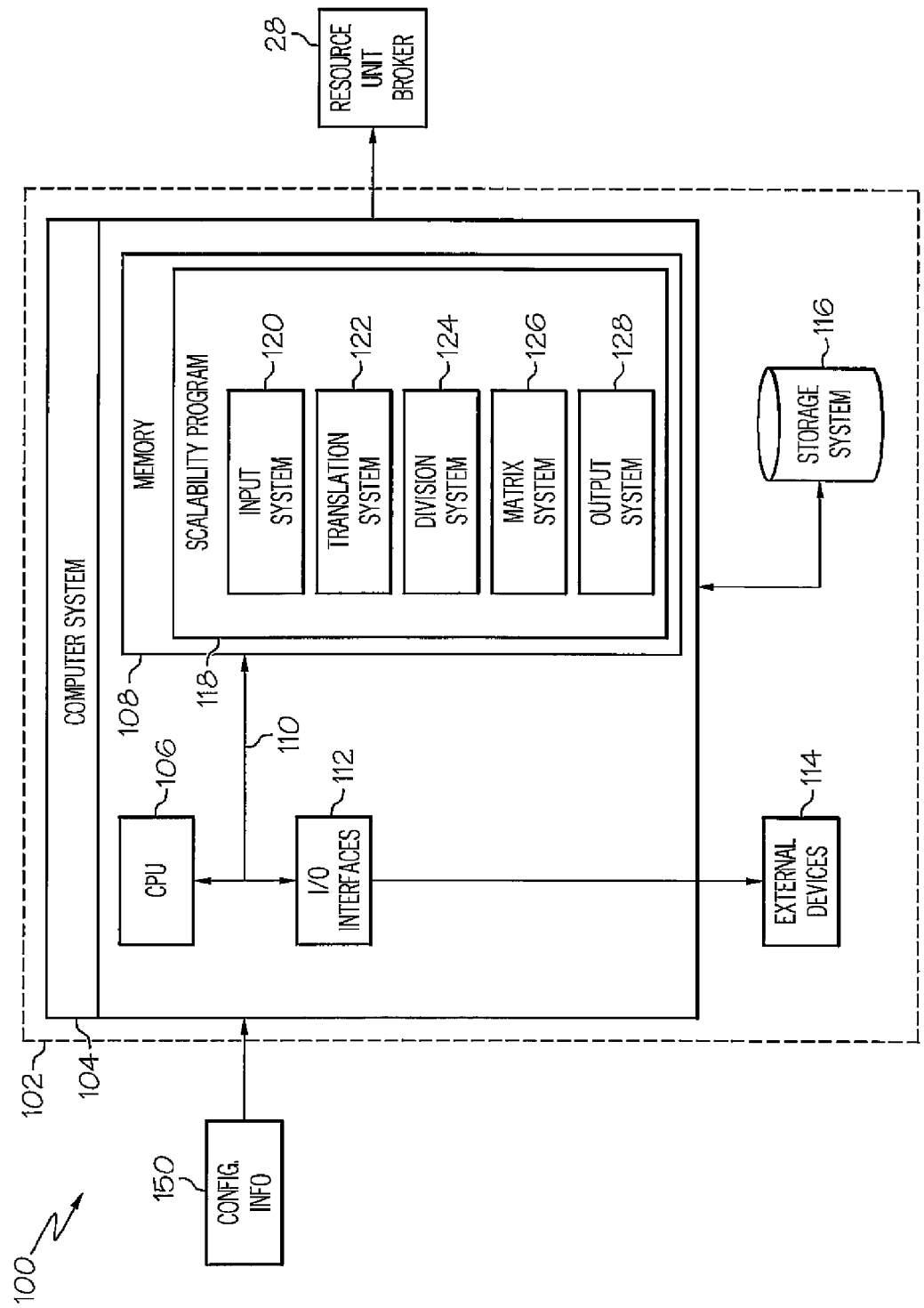
FIG. 3 shows a more detailed computerized implementation of the present invention.

Referring now to FIG. 3, a more detailed diagram of a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as scalability program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 3 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104. It should be understood computer system 104 could be any combination of human, hardware and/or software. It is shown as such to illustrate the functions as described herein. To this extent, the functions of computer system 104 could be provided by any of the components of FIG. 1 (e.g., agents 14A-N, resource unit broker 28 shown separately in FIG. 3 for illustrative purposes).

Shown in memory 108 of computer system 104 is scalability program 118, which facilitates the functions as described herein. It should be understood that resource unit broker 28 can provide any of functions described in the above-incorporated applications. As depicted, scalability program 118 includes input system 120, translation system 122, division system 124, matrix system 126, and output system 128. It should be understood that this configuration of functionality is intended to be illustrative only, and that identical or similar functionality could be provided with a different configuration of systems.

In any event, scalability program 118 facilitates the functions as described herein. Specifically, input system 120 is configured to obtain configuration information, and extract any configuration information pertaining to a scalability service category. Translation system 122 will then translate the configuration information that pertains to a scalability service category into a quantity of resource units. Division system 124 divides the quantity of resource units by an associated cost for each of a set of service levels. Matrix system 126 will determine a maximum quantity of each of the set of service levels that can be allocated for the quantity of resource units, and generate a matrix of possible configurations. Output system 128 will provide the matrix to resource unit broker 28 (in the event that scalability program 118 is not provided directly on resource unit broker 28. In any event, upon receipt of the matrix, resource unit broker 28 will use the matrix in an auction of computer resources, determine a winner of the auction, apply a multiplier to a bid of chips submitted by the winner to yield an adjusted amount of chips, and deducting the adjusted amount of chips from a quantity of chips allocated to the winner. These functions could be provided by an auction program or the like (having one or more subsystems). Such an auction program could incorporate any of the functions of the above-incorporated applications.

While shown and described herein as a method and system for applying brokering characteristics to scalability characteristics, it is understood that the invention further provides various alternative embodiments. For example, in one embodiment, the invention provides a computer-readable/useable medium that includes computer program code to enable a computer infrastructure to apply brokering methods to scalability characteristics. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to apply brokering methods to scalability characteristics. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for applying brokering methods to scalability characteristics. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for applying brokering methods to scalability characteristics performed on at least one computing device, comprising:
   translating configuration information that pertains to a plurality of scalability service categories into distinct quantities of resource units, each quantity attributable to a distinct scalability category using the at least one computing device;
   for each distinct scalability service category, dividing the quantity of resource units by an associated cost for each of a set of service levels using the at least one computing device;
   for each distinct scalability service category, determining a maximum quantity of each of the set of service levels that can be allocated for the quantity of resource units using the at least one computing device;
   generating a matrix including possible configurations of the quantity of resource units and the set of service levels for each distinct scalability service category, using the at least one computing device;
   providing the matrix to a resource unit broker using the at least one computing device;
   receiving a winning bid for one of the distinct scalability service categories from an auction performed by the resource unit broker; and
   applying a multiplier to the winning bid to adjust the cost of the winning bid based on a service level of the bid using the at least one computing device.

2. The method of claim 1, further comprising using the matrix in the auction of computer resources.

3. The method of claim 1, further comprising deducting the adjusted cost from a quantity of chips allocated to the winner.

4. The method of claim 1, the bid being submitted to the resource unit broker by an agent on behalf of a party, and the bid being one a plurality of bids submitted by at least one agent on behalf of a plurality of parties.

5. A system for applying brokering methods to scalability characteristics, comprising:
   at least one computing device including:
   a system for translating configuration information that pertains to a plurality of scalability service categories into distinct quantities of resource units, each quantity attributable to a distinct scalability service category;
   a system for dividing, for each distinct scalability service category, the quantity of resource units by an associated cost for each of a set of service levels;
   a system for determining, for each distinct scalability service category, a maximum quantity of each of the set of service levels that can be allocated for the quantity of resource units;
   a system for generating a matrix including possible configurations of the quantity of resource units and the set of service levels for each distinct scalability service category;
   a system for providing the matrix to a resource unit broker;
   a system for receiving a winning bid for one of the distinct scalability service categories from an auction performed by the resource unit broker; and
   a system for applying a multiplier to the winning bid to adjust the cost of the winning bid based on a service level of the bid using the at least one computing device.

6. The system of claim 5, further comprising a system for using the matrix in the auction of computer resources.

7. The system of claim 5, further comprising a system for deducting the adjusted cost from a quantity of chips allocated to the winner.

8. The system of claim 5, the bid being submitted to the resource unit broker by an agent on behalf of a party, and the bid being one a plurality of bids submitted by at least one agent on behalf of a plurality of parties.

9. A program product stored on a computer readable storage medium for applying brokering methods to scalability characteristics, the computer readable medium comprising program code for causing a computer system to:
   translate configuration information that pertains to a plurality of scalability service categories into distinct quantities of resource units, each quantity attributable to a distinct scalability service category;
   for each distinct scalability service category, divide the quantity of resource units by an associated cost for each of a set of service levels;
   for each distinct scalability service category, determine a maximum quantity of each of the set of service levels that can be allocated for the quantity of resource units;
   generate a matrix including possible configurations of the quantity of resource units and the set of service levels for each distinct scalability service category;
   provide the matrix to a resource unit broker;
   receive a winning bid for one of the distinct scalability service categories from an auction performed by the resource unit broker; and
   apply a multiplier to the winning bid to adjust the cost of the winning bid based on a service level of the bid using the at least one computing device.

10. The program product of claim 9, further comprising program code for using the matrix in the auction of computer resources.

11. The program product of claim 9, further comprising program code for causing the computer system to deduct the adjusted cost from a quantity of chips allocated to the winner.

12. The program product of claim 9, the bid being submitted to a resource unit broker by an agent on behalf of a party, and the bid being one a plurality of bids submitted by at least one agent on behalf of a plurality of parties.

13. A method for deploying a system for applying brokering methods to scalability characteristics, comprising:

providing a computer infrastructure including at least one computing device being operable to:
    translate configuration information that pertains to a plurality of scalability service categories into distinct quantities of resource units each quantity attributable to a distinct scalability service category using the at least one computing device;
    for each distinct scalability service category, divide the quantity of resource units by an associated cost for each of a set of service levels;
    for each distinct scalability service category, determine a maximum quantity of each of the set of service levels that can be allocated for the quantity of resource units;
    generate a matrix including possible configurations of the quantity of resource units and the set of service levels for each distinct scalability service category using the at least one computing device;
    provide the matrix to a resource unit broker using the at least one computing device;
    receive a winning bid for one of the distinct scalability service categories from an auction performed by the resource unit broker; and
    apply a multiplier to the winning bid to adjust the cost of the winning bid based on a service level of the bid using the at least one computing device.

14. The method of claim 1, wherein after the receiving of the winning bid, further comprising:
    adjusting the distinct quantity of resource units by at least a portion of the quantity of resource units for the scalability service category associated with the winning bid; and
    repeating the determining, generating, providing and receiving for a subsequent auction based upon the adjusted quantity.

15. The method of claim 14, wherein, for each distinct scalability service category, a reserve price is determined for the subsequent auction based upon the adjusted cost.

16. The method of claim 14, further comprising reserving the at least a portion of the quantity of resource units associated with the winning bid for providing scalability to a bidder of the winning bid.

17. The system of claim 5, further comprising:
    a system for adjusting the distinct quantity of resource units by at least a portion the quantity of resource units for the scalability service category associated with the winning bid after the receiving of the winning bid; and
    a system for repeating the determining, generating, providing and receiving for a subsequent auction based upon the adjusted quantity.

18. The system of claim 17, wherein, for each distinct scalability service category, a reserve price is determined for the subsequent auction based upon the adjusted cost.

19. The system of claim 17, further comprising a system for reserving the at least a portion of the quantity of resource units associated with the winning bid for providing scalability to a bidder of the winning bid.

20. The program product of claim 9, further comprising program code for:
    adjusting the distinct quantity of resource units by at least a portion the quantity of resource units for the scalability service category associated with the winning bid after the receiving of the winning bid; and
    repeating the determining, generating, providing and receiving for a subsequent auction based upon the adjusted quantity.

21. The program product of claim 20, further comprising program code for determining a reserve price for the subsequent auction based upon the adjusted cost for each distinct scalability service category.

22. The program product of claim 20, further comprising program code for reserving the at least a portion of the quantity of resource units associated with the winning bid for providing scalability to a bidder of the winning bid.

* * * * *